United States Patent
Rüdenauer et al.

(12) 
(10) Patent No.: US 6,673,486 B2
(45) Date of Patent: Jan. 6, 2004

(54) TIMING MECHANISM FOR CONTROLLING THE CHARGING OF A BATTERY IN AN ELECTRONIC ARTILLERY FUSE

(75) Inventors: Werner Rüdenauer, Roth (DE); Karl Glatthaar, Oberndorf (DE); Wolfgang Müller, Mönchweiler (DE); Walter Winterhalter, Tennenbronn (DE); Alexander Zinell, Schramberg (DE)

(73) Assignee: Junghans Feinwerktechnik GmbH & Co. KG, Schramberg (DE)

( * ) Notice: Subject to any disclaimer, the term of this patent is extended or adjusted under 35 U.S.C. 154(b) by 28 days.

(21) Appl. No.: 09/921,598

(22) Filed: Aug. 6, 2001

(65) Prior Publication Data

US 2002/0034681 A1 Mar. 21, 2002

(30) Foreign Application Priority Data

Aug. 4, 2000 (DE) .......................... 100 38 066

(51) Int. Cl.[7] ................................. H01M 6/36
(52) U.S. Cl. .................. 429/114; 429/110; 429/116
(58) Field of Search ................. 429/110, 114, 429/116

(56) References Cited

U.S. PATENT DOCUMENTS

| 3,945,845 A | 3/1976 | Morganstein |
| 4,218,525 A | 8/1980 | Selgin |
| 4,612,264 A | * 9/1986 | Fairwood et al. ........... 429/114 |

FOREIGN PATENT DOCUMENTS

| DE | 37 18 788 | 12/1987 |
| DE | 37 43 535 | 7/1989 |
| WO | WO 00/31497 | 6/2000 |

* cited by examiner

Primary Examiner—Carol Chaney
Assistant Examiner—Dah-Wei Yuan
(74) Attorney, Agent, or Firm—Burns, Doane, Swecker & Mathis, LLP

(57) ABSTRACT

As activatable battery for an electronic artillery fuse includes an ampoule filled with an electrolyte, and an activation device for rupturing the ampoule in response to the application of an impulse of predetermined minimum magnitude. The activation device includes a timing mechanism for increasing the duration for which the impulse must be applied in order to enable the rupturing to occur, thereby increasing the safety of the fuse.

10 Claims, 1 Drawing Sheet

TIMING MECHANISM FOR CONTROLLING THE CHARGING OF A BATTERY IN AN ELECTRONIC ARTILLERY FUSE

This application claims priority under 35 U.S.C. §§119 and/or 365 to patent application Ser. No. 100 38 066.2 filed in Germany on Aug. 4, 2001, the entire content of which is hereby incorporated by reference.

BACKGROUND OF THE INVENTION

The invention concerns an activatable battery for an electronic artillery fuse of the type comprising an ampoule filled with electrolyte and an activation device for rupturing the ampoule in response to the launching of an artillery shell carrying the fuse.

Such a battery of lithium-thionyl chloride type with a plurality of cells is known for example from German Document 37 18 788-A1. That known battery includes a container in which is disposed a rupturable vessel or ampoule which is filled with electrolyte. Also within the container is a stack of inert metal discs or plates which have a lithium layer on one surface and a layer of bound carbon black on the other surface. The metal plates or discs which are coated in that way are separated from each other by separators and form the pile of the multi-cell battery. The pile is contacted with electrodes. Disposed outside the container is a kinetic weight which functions as an inertia body and is so dimensioned that it ruptures the ampoule when a given level of acceleration is applied.

Electronic artillery fuses involve the use of activatable batteries of that kind, which in general are activated by the acceleration occurring upon launch of a projectile provided with the artillery fuse. The ruputable ampoule in the battery is associated with an activation device in the form of for example, an inertia body (kinetic weight) and which is restrained against initial movement by, for example, a spring element or a tear-away cross-piece. Activation of the battery is triggered by virtue of the fact that, when a defined level of acceleration is reached, the resulting impulse acting on the fuse causes the preset spring force of the spring element to be exceeded (or the tear-away cross-piece tears away). Upon such activation occurring, the ampoule immediately impacts against an abutment (formed for example by the bottom of the battery) and ruptures, with the electrolyte in the ampoule being released. The electrolyte then penetrates into the cells of the battery whereafter the battery supplies an electrical voltage.

Those simple triggering mechanisms of the activation device which rely solely upon a spring element or a tear-away cross-piece to control the movement are thus dependent on the magnitude of the force (impulse) acting on the fuse, i.e., the design is force magnitude-dependent. Typically, the design is such that the triggering of the battery occurs as soon as the impulse acting on a projectile reaches a certain magnitude, which magnitude is intended to equal the minimum acceleration level available in the launch barrel (in order to achieve a high level of triggering reliability). For safety reasons, that magnitude should be far greater than any possible non-launch impulses that can be applied to the battery such as unwanted shocks or impacts which occur when handling the fuses or projectiles.

In new modern weapon systems, more specifically in the case of artillery, the loadings applied to the battery during handling and automatic feed into the ammunition store have increased. On the other hand, due to the increased-length barrels, the minimum launch accelerations available therein have further decreased. Those two aspects, that is to say the increased non-launch loadings, and the reduction in the minimum available launch acceleration conflict with each other in relation to the activation level which is to be set for the batteries. In the case of new modern weapon systems, it is not impossible for the minimum available launch acceleration to be at a lower level than that occurring when a fuse is accidentally dropped freely from the normal handling height. As is readily clear, the result of this is that, upon such unwanted handling loadings or in the event of the fuse falling freely from the handling height, the battery is undesirably prematurely activated and as a result the fuse is then no longer operational.

In consideration of those factors, an object of the present invention is to provide an activatable battery of the kind set forth in the opening part of this specification, with reliable free-fall safety.

SUMMARY OF THE INVENTION

In accordance with the invention, that object is attained by a battery for an electronic artillery fuse. The battery is activated in response to the release of electrolyte contained in the battery. The battery comprises a rupturable ampoule containing the electrolyte. The ampoule is rupturable in response to contact with a rupturing surface of the battery. The ampoule is normally held in mutually spaced relationship to the rupturing surface. A restraining member is provided which applies a yieldable restraining force for opposing inertia applied to the fuse to maintain the mutually spaced relationship. The restraining force is yieldable against inertia greater than a predetermined value to permit the ampoule and the rupturing surface to approach one another. A timing device is provided for increasing a time period that the inertia of predetermined value must be applied in order for the ampoule and the rupturing surface to contact one another.

By virtue of the fact that, in accordance with the invention, the activation device which is provided to rupture the ampoule which is filled with the electrolyte has a timing member which is provided to evaluate the duration of the shock force respectively acting on the battery, that is to say the impulse, it is possible for the acceleration profile of an unwanted shock or impact upon handling or in the event of a free fall from the handling height to be clearly distinguished from launch acceleration in the barrel. In the event of a free fall onto hard ground the duration of the impulse is in the $\mu$sec range. In the event of launch from a barrel the impulse duration is in the msec range. By means of the activatable battery according to the invention, the problem of known activatable batteries which utilise only the impulse magnitude, that is to say the impulse amplitude, can be resolved by virtue of the fact that the activation device which hitherto evaluates only the magnitude of the acceleration is replaced by an activation device which evaluates the impulse duration. Loadings involved in handling, for example due to unwanted shocks or impacts, in the automatic feed into the ammunition store or when a fuse is allowed to fall free with the battery fitted thereto, from the handling height, are not relevant in relation to the activatable battery according to the invention, that is to say they do not result in failure of the battery.

The small compact structure of the overall arrangement which is inexpensive to produce is an advantage. Impulse safety is therefore not susceptible to trouble, within the battery housing, in the event of external influences acting thereon.

BRIEF DESCRIPTION OF THE DRAWINGS

An embodiment of the activatable battery according to the invention for an electronic artillery fuse is described hereinafter and illustrated in the drawing, in which respect it will be appreciated that the invention is not limited to the illustrated embodiment. In the drawing.

DETAILED DESCRIPTION OF A PREFERRED EMBODIMENT OF THE INVENTION

Figure 1:
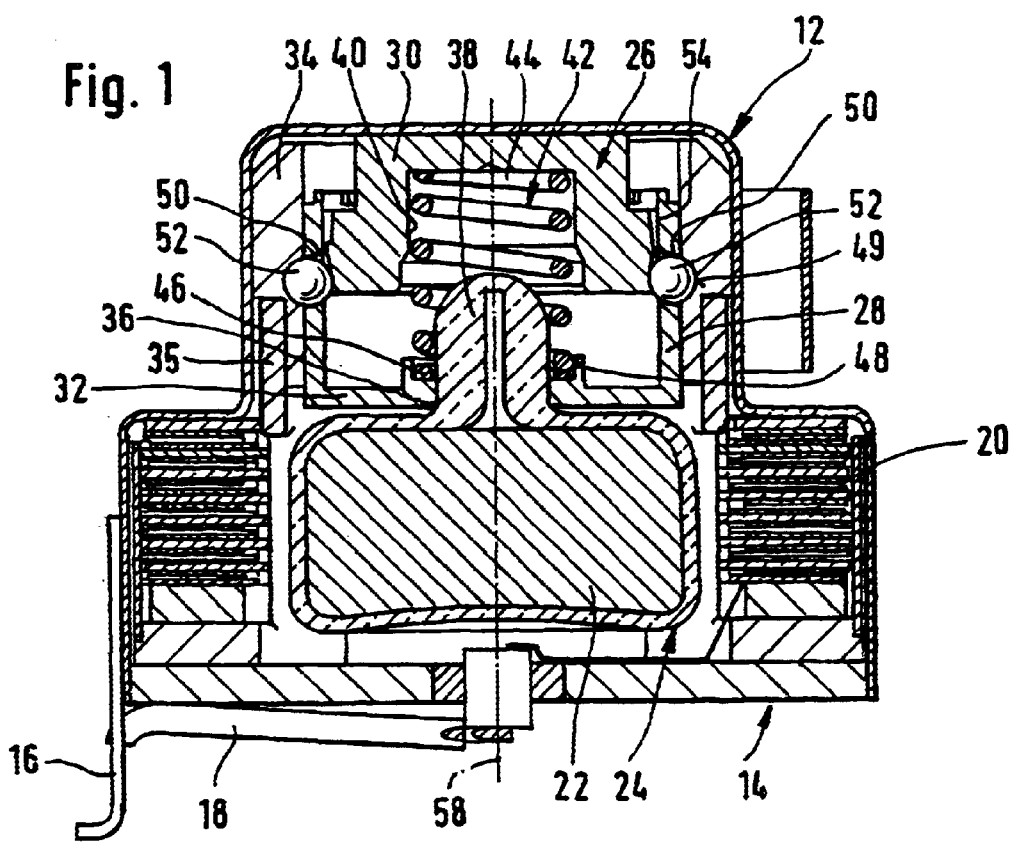
FIG. 1 is a view in section through the battery.

FIG. 1 is a view in section of an embodiment of the activatable battery 10. The battery 10 has a cup-shaped battery housing 12 which is sealingly closed by a cover 14. The battery housing 12 comprises a deepdrawn metal sheet and is electrically conductively connected to an electrode 16. A second electrode 18 extends through the cover 14 in electrically insulated relationship. The electrodes 16 and 18 are contacted to a battery cell 20 in pile or stack form, which can be galvanically activated by an electrolyte 22. The electrolyte 22 is disposed in an ampoule 24 which for example comprises glass. Associated with the ampoule 24 which is filled with the electrolyte 22 is an activation device 26 which serves for defined rupture of the ampoule 24. For that defined rupture of the ampoule, the activation device 26 has a timing member which is provided to evaluate or determine the duration of the shock force or impulse respectively acting on the battery 10. The timing member is a mechanical timing member which includes a cylindrical ampoule holding body 28 and an inertia body or ampoule-release body 30. The ampoule holding body 28 has a bottom 32 and a fixed cylindrical sleeve 34. The cylindrical sleeve 34 is fitted into a support sleeve 35 which is supported on the battery cell 20. The bottom 32 of the ampoule holding body 28 is provided with a central hole 36. The rupturable ampoule 24 has a projection 38 which extends through the central hole 36 in the bottom 32 of the ampoule holding body 28 to attach the ampoule 24 to the body 28.

The inertia body 30 of the activation device 26 is of a hat-like cross-sectional profile, that is to say it has a central blind hole 40 arranged to receive the ampoule projection 38.

Arranged between the ampoule holding body 28 and the inertia body 30 is a restraining member for resisting initial movement of the inertia body. That restraining member comprises a compression spring element 42 in the form of a coil spring. The compression spring element 42 has one of its ends 44 disposed in the central blind hole 40 of the inertia body 30 and another of its ends 46 disposed on the bottom 32 of the ampoule holding body 28. For that purpose the bottom 32 has a spring-receiving collar 48.

Along its inside periphery the cylindrical sleeve 34 is provided with a recess in the form of an annular groove 49, and the ampoule holding body 28 is provided at equal spacings around its periphery with holes 50 in which respective balls 52 are arranged. The balls 52 are disposed in the annular groove 49 and project from respective holes 50 of the ampoule holding body 28 to hold the ampoule 24 above the cover 14 at a distance therefrom.

Figure 2:
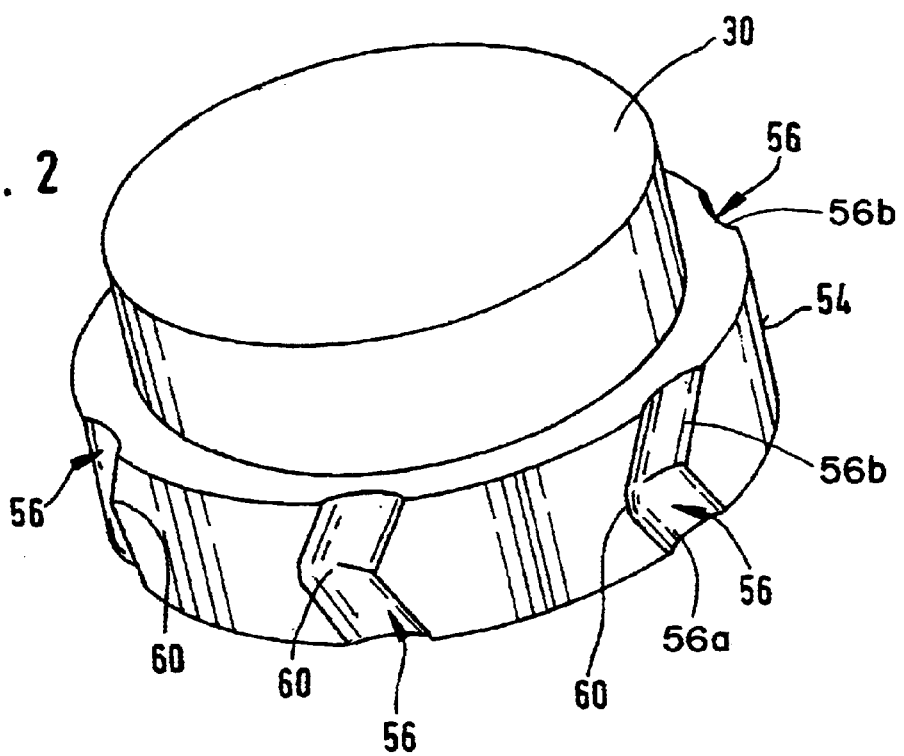
FIG. 2 is a top perspective view of the inertia body of the battery of FIG. 1.

The inertia body 30 has a cylindrical peripheral surface 54 which as can be clearly seen from FIG. 2, is provided with a number of zigzag-shaped grooves 56, that number corresponding to the number of holes 50 in the cylindrical sleeve 34 of the ampoule holding body 28. The zigzag-shaped grooves 56 are equidistantly spaced from each other, like the holes 50. The balls 52 project into the zigzag-shaped grooves 56, as can be seen from FIG. 1. Each groove 56 includes a front section 56a and a rear section 56b. The front section 56a extends in a direction having an axial forward component (i.e., downwardly in FIG. 1), and a first circumferential component in one circumferential direction (i.e., to the right in FIG. 2) The rear section 56b extends in a direction having an axial forward component, and a second circumferential component in an opposite circumferential direction than the first circumferential component (i.e., to the left in FIG. 2).

The mode of operation of the battery 10 shown in FIG. 1 is described hereinafter:

Activation of the battery 10 upon launch of a projectile having the battery 10 shown in FIG. 1, from a barrel:

Due to the launch acceleration the inertia body 30 is urged against the force of the compression spring element 42 in a direction towards the cover 14 of the battery 10, that is to say toward the ampoule 24 filled with the electrolyte 22. Once the resistance force of the spring element 42 is overcome, i.e., once the inertia applied to the battery exceeds a predetermined value, the inertia body begins to move. Due to the engagement of the balls 52 in the grooves 56 which are angled in a zigzag-shape and which are provided at the periphery of the cylindrical surface 54 of the inertia body 30, the movement of the inertia body 30 is not in a linear axial direction, but rather in only a generally axial direction. That is, in order to move generally axially, the inertia body 30 must rotate about the central longitudinal axis 58 in one direction of rotation (to enable front sections 56a of the grooves 56 to travel along the balls 52) and subsequently in the oppositely direction of rotation (to enable rear sections 56b of the grooves 56 to travel along the balls 52), in order to travel the axial distance necessary for enabling the balls to exit the ampoule holding body 28. Those rotary movements create a timing delay. As will be readily apparent, the launch acceleration must be operative with a given magnitude over a relatively long given period of time in the msec range, (i.e., longer than if the balls 52 were not present) to enable the inertia body 30 to reach a limit position for releasing the balls 52. When the inertia body 30 of the activation device 26 has reached that limit position, i.e., wherein the balls are no longer blocked by the inertia body from exiting the grooves 56, the balls 52 are free to exit the ampoule holding body 28 and the sleeve 34 in a radially inward direction. Due to the launch acceleration, which in that situation is still further operative or applied and/or due to the compression spring 42 which is now mechanically stressed (e.g., compressed), the ampoule 24 is accelerated towards and against the cover 14 of the battery, in which case the ampoule 24 ruptures and the electrolyte 22 in the ampoule 24 is released. Thus, the cover 14 constitutes a rupturing surface. The released electrolyte 22 penetrates into the battery cell 20 so that a corresponding electrical voltage occurs at the electrodes 16 and 18.

It will thus be appreciated that the timing mechanism 52, 56 increases the time period necessary for the inertia body to travel a given axial distance by causing the body to also travel in a second direction, i.e, a generally circumferential zig-zag direction, which is different from the axial direction. Accordingly, instead of being merely force magnitude-dependent as in conventional fuses, the fuse according to the invention is also force duration-dependent.

Non-activation upon impact loading:

In the event of an unwanted shock or impact during a handling situation or an automatic feed into the ammunition store or in the event of free fall of an artillery fuse from the respective handling height, wherein the resulting impulse is high enough to overcome the restraining force of the spring 42, the battery 10 starts off as described above. In other words, the inertia body 30 simultaneously performs axial and rotary movements. As shocks or impacts under some circumstances do in fact involve a high impulse maximum, but conversely are of substantially shorter duration, the inertia body 30 may perform only one rotary movement and simultaneously an axial advancing movement at most as far as the change in direction at the point of intersection 60 of the sections 56a, 56b of the zigzag-shaped grooves 56. Then the advancing movement stops (when the shock or impact stops) and the body 30 thereafter is moved back into the initial position by the spring element 42. The battery 10 is therefore not activated. What is important in that respect is that the acceleration of the inertia body 30 due to a shock or impact must have died away by the time that the deflection locations 60 in the zigzag-shaped grooves 56 reach the balls 52. That can be precisely adjusted without any problem by a suitable dimensioning of the inertia body 30, that is to say its moment of inertia.

The battery 10 illustrated in the drawing, as already mentioned above, only represents one possible embodiment and thus does not limit the scope of the invention. The act of distinguishing the accelerations as between an unwanted shock or impact and launch from a barrel by way of the period of action, that is to say the impulse duration, can be achieved in different ways. What is important is that there is a timing member which produces a delay that is long enough for safety reasons, but short enough to ensure that there will still be sufficient acceleration of the artillery shell for the further operating procedure of the activation device 26, for activation after the timing member has operated. The timing member can be a mechanical timing member, a hydraulic timing member or a pneumatic timing member. The timing member can employ a traditional double-shear-pin safety arrangement or for example a mechanical restraint regulator or may only make use of friction.

For activation purposes, that is to say for rupturing of the ampoule 24, the launch acceleration which acts on the inertia body 30 can be used in combination with the mass of the ampoule 24 and the ampoule holding body 28 or may be sufficient in itself. In addition the compression spring element 42 may also be used as the sole, or auxiliary means of resisting initial movement of the body 30. Likewise it is possible for the ampoule 24 to perform no movement or only a very small movement, in which respect that small movement can be in the range of play tolerances if the mass of the ampoule holding body 28 and the triggering element, that is to say the inertia body 30, in combination with the launch acceleration, is in a position to rupture the ampoule 24 due to the corresponding inertia forces.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A battery for an electronic artillery fuse, the battery being activated in response to the release of electrolyte contained in the battery, the battery comprising:
   a rupturable ampoule containing the electrolyte, the ampoule being rupturable in response to contact with a rupturing surface of the battery, the ampoule normally held in mutually spaced relationship to the rupturing surface;
   a restraining member applying a yieldable restraining force for opposing inertia applied to the fuse to maintain the mutually spaced relationship, the restraining force being yieldable against inertia greater than a predetermined value to permit the ampoule and the rupturing surface to approach one another;
   a timing device for increasing a time period that the inertia of predetermined value must be applied for the ampoule and the rupturing surface to contact one another; and
   an ampoule holding body in which the ampoule is mounted, the ampoule holding body normally secured against movement to prevent the ampoule from approaching the rupturing surface, a release body arranged for releasing the ampoule holding body in response to movement of the release body by a predetermined distance in a first direction under the influence of an impulse, the timing device arranged to constrain the release body to rotate about an axis defined by the first direction as the release body travels in the first direction, for increasing a time period required for the release body to travel the predetermined distance.

2. The battery according to claim 1 wherein the timing device is arranged to control movement of the ampoule holding body independently of the restraining member.

3. The battery according to claim 1 wherein the timing device is arranged to constrain the release body to rotate successively in opposite directions about the axis as the release body moves in the first direction.

4. The battery according to claim 1 wherein the timing device comprises a ball mounted in a hole formed in the ampoule holding body and in a recess formed in a fixed member of the battery for securing the ampoule holding body against movement in the first direction, the release body including a groove in which the ball is disposed, wherein the presence of the ball in the groove prevents the ball from exiting the hole of the ampoule holding body, the groove oriented non-parallel to the first direction, to constrain the release body to rotate about the axis as the release body travels in the first direction.

5. The battery according to claim 4 wherein the groove includes a front section and a rear section following the front section in the first direction, the front and rear sections being angled relative to one another to constrain the release body to rotate in the opposite direction.

6. The battery according to claim 5 wherein the restraining member comprises a spring arranged to be stressed by the release body as the release body travels in the first direction.

7. The battery according to claim 6 wherein the ampoule holding body includes a bottom having a central hole, the ampoule including a projection extending through the central hole toward the release body.

8. The battery according to claim 7, wherein the spring comprises a compression spring disposed in a central blind hole of the release body, the blind hole being axially aligned with the central hole in the bottom, the spring arranged to act between the bottom and the release body.

9. The battery according to claim 7 wherein the ampoule-holding body includes a cylindrical sleeve attached to the floor, the cylindrical sleeve forming the hole in which the ball is disposed.

10. The battery according to claim 9 further including a battery cell, the fixed member mounted on the cell.

* * * * *